US012749465B2

(12) United States Patent
Taguchi et al.

(10) Patent No.: US 12,749,465 B2
(45) Date of Patent: Sep. 29, 2026

(54) DISPLAY SYSTEM FOR VEHICLE, DISPLAY METHOD FOR VEHICLE, AND NON-TRANSITORY COMPUTER-READABLE STORAGE MEDIUM FOR DISPLAY SYSTEM

(71) Applicant: DENSO CORPORATION, Kariya-city (JP)

(72) Inventors: Kiyotaka Taguchi, Kariya-city (JP); Akira Kamiya, Kariya-city (JP); Yasuhiko Joho, Kariya-city (JP); Hiroyuki Mimura, Kariya-city (JP); Toshinori Mizuno, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 424 days.

(21) Appl. No.: 18/474,833

(22) Filed: Sep. 26, 2023

(65) Prior Publication Data

US 2024/0017616 A1 Jan. 18, 2024

Related U.S. Application Data

(63) Continuation of application No. PCT/JP2022/013559, filed on Mar. 23, 2022.

(30) Foreign Application Priority Data

Mar. 30, 2021 (JP) ................................ 2021-057356

(51) Int. Cl.
*B60K 35/81* (2024.01)
*B60K 35/10* (2024.01)
(Continued)

(52) U.S. Cl.
CPC .............. *B60K 35/81* (2024.01); *B60K 35/10* (2024.01); *B60K 35/22* (2024.01); *B60K 35/29* (2024.01);
(Continued)

(58) Field of Classification Search
CPC ........ B60K 35/10; B60K 35/22; B60K 35/29; B60K 35/81; B60K 35/265;
(Continued)

(56) References Cited

U.S. PATENT DOCUMENTS 8,674,820 B2 * 3/2014 Hofmann ............. B60K 35/213 340/461
8,885,103 B2 * 11/2014 Fujiwara ................ H04N 21/47 345/204
(Continued)

FOREIGN PATENT DOCUMENTS

JP 2002-175067 A 6/2002
JP 2007519984 A 7/2007
(Continued)

*Primary Examiner* — Rami Khatib
(74) *Attorney, Agent, or Firm* — Harness, Dickey & Pierce, P.L.C.

(57) ABSTRACT

A display system for a vehicle generates a first image content to be displayed at a first frame rate in a first display area, a second image content to be displayed at a second frame rate in a second display area adjacent to the first display area, and an inter-area image to be displayed between the first display
(Continued)

area and the second display area. Further, the display system synthesizes and outputs the first image content, the second image content, and the inter-area image.

12 Claims, 10 Drawing Sheets

(51) Int. Cl.

| | |
|---|---|
| ***B60K 35/22*** | (2024.01) |
| ***B60K 35/26*** | (2024.01) |
| ***B60K 35/29*** | (2024.01) |
| ***G09G 5/12*** | (2006.01) |

(52) U.S. Cl.
CPC .............. *G09G 5/12* (2013.01); *B60K 35/265* (2024.01); *B60K 2360/182* (2024.01); *G09G 2340/0435* (2013.01); *G09G 2380/10* (2013.01)

(58) Field of Classification Search
CPC ............... B60K 2360/182; G09G 5/12; G09G 2340/0435; G09G 2380/10; G09G 3/20; G09G 5/14; G06F 3/147; B60R 11/02; G06T 11/80
See application file for complete search history.

(56) References Cited

U.S. PATENT DOCUMENTS

| | | | | |
|---|---|---|---|---|
| 10,467,987 | B2 * | 11/2019 | Kim | G09G 5/14 |
| 2002/0075136 | A1 | 6/2002 | Nakaji et al. | |
| 2007/0273638 | A1 | 11/2007 | Nohno et al. | |
| 2008/0150709 | A1 | 6/2008 | Yamamoto et al. | |
| 2008/0197990 | A1 | 8/2008 | Yamamoto et al. | |
| 2008/0204205 | A1 | 8/2008 | Yamamoto et al. | |
| 2008/0252439 | A1 | 10/2008 | Yamamoto et al. | |
| 2010/0265053 | A1 | 10/2010 | Yamamoto et al. | |
| 2011/0109526 | A1 | 5/2011 | Bauza et al. | |
| 2018/0039470 | A1 * | 2/2018 | Tokita | G06F 3/1423 |
| 2020/0254879 | A1 | 8/2020 | Aoki et al. | |
| 2022/0083305 | A1 | 3/2022 | Ino | |

FOREIGN PATENT DOCUMENTS

| | | | |
|---|---|---|---|
| JP | 2008195393 | A | 8/2008 |
| JP | 2016013747 | A | 1/2016 |
| JP | 2017187758 | A | 10/2017 |
| JP | 2020008740 | A | 1/2020 |
| JP | 2020-131729 | A | 8/2020 |
| JP | 2020197664 | A | 12/2020 |

* cited by examiner

DISPLAY SYSTEM FOR VEHICLE, DISPLAY METHOD FOR VEHICLE, AND NON-TRANSITORY COMPUTER-READABLE STORAGE MEDIUM FOR DISPLAY SYSTEM

CROSS REFERENCE TO RELATED APPLICATIONS

The present application is a continuation application of International Patent Application No. PCT/JP2022/013559 filed on Mar. 23, 2022, which designated the U.S. and claims the benefit of priority from Japanese Patent Application No. 2021-057356 filed on Mar. 30, 2021. The entire disclosures of all of the above applications are incorporated herein by reference.

TECHNICAL FIELD

The present disclosure relates to a display system for a vehicle, a display method for a vehicle, and a non-transitory computer-readable storage medium for a display system for a vehicle.

BACKGROUND

For example, a vehicle cockpit system disposed at a front part of a vehicle cabin includes a plurality of displays such as a meter display, a center display, and a head-up display, and electric control units (ECUs) executes drawing processing for the respective displays. In recent years, it has been desired to increase the size of a display installed in a vehicle. Also, a technique of configuring a cockpit system including multiple displays disposed side by side has been provided.

SUMMARY

According to an aspect of the present disclosure, a display system for a vehicle generates a first image content to be displayed in a first display area at a first frame rate, a second image content to be displayed at a second frame rate in a second display area adjacent to the first display area, and an inter-area image to be displayed in an inter-area between the first display area and the second display area, and synthesizes and outputs the first image content, the second image content, and the inter-area image.

BRIEF DESCRIPTION OF DRAWINGS

Features and advantages of the present disclosure will become more apparent from the following detailed description made with reference to the accompanying drawings, in which.

DETAILED DESCRIPTION

Figure 1:
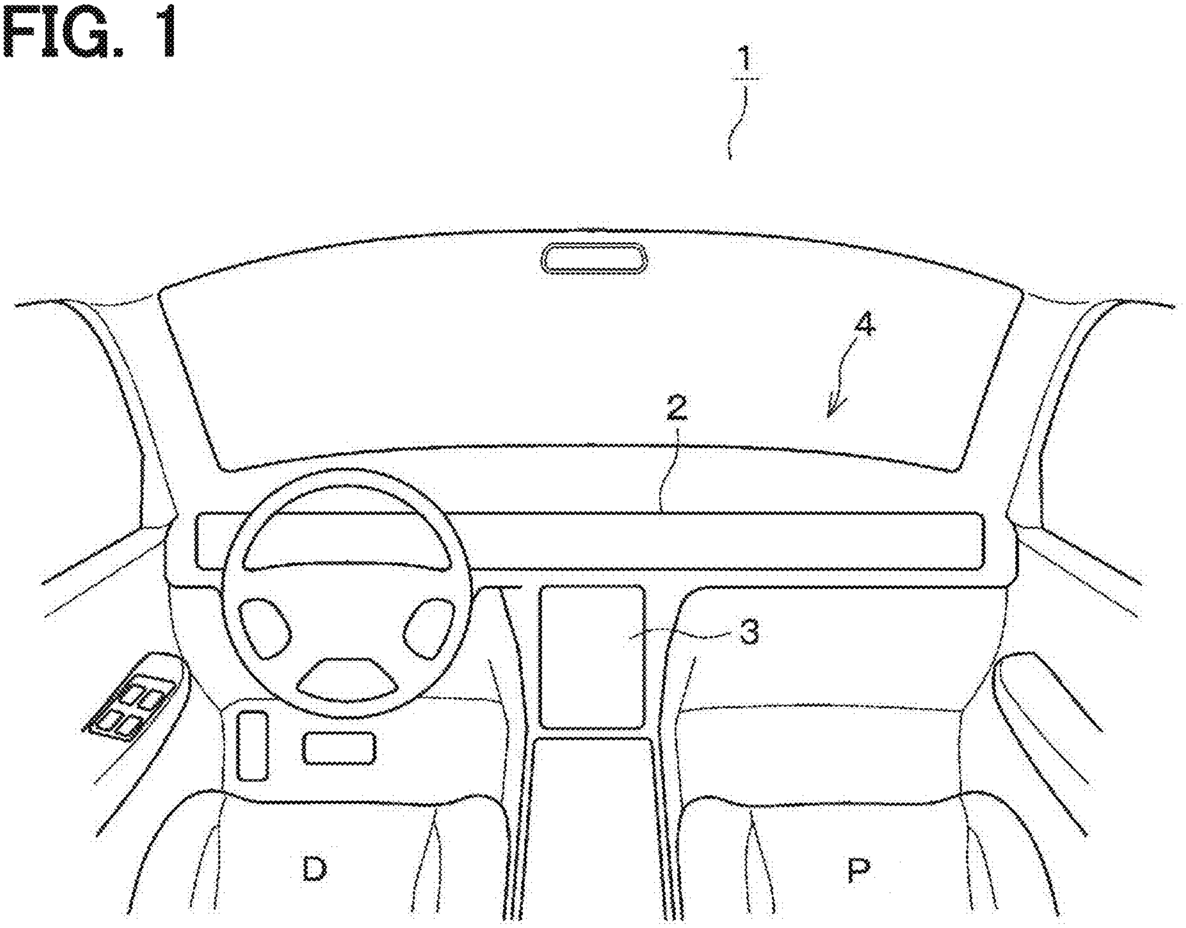
FIG. 1 is a diagram illustrating an appearance of a cockpit system according to an embodiment.

In a display processing for a vehicle cockpit system having multiple displays disposed side by side, an image content drawn on each display is processed to have a unique frame rate. For example, a video captured by a camera is processed to have the frame rate of 30 fps, and a map image is processed to have the frame rate of 10 fps. In a case where the same image content is divided into two pieces and displayed on two displays, if a difference occurs in generation speed of drawing data due to execution of the image processing, image conversion or the like, there is a fear that the same image content will not be displayed at the same frame.

When contents are drawn at different frame rates on adjacent displays arranged side by side, there is a difference in motion between images displayed in display areas of the adjacent displays. For this reason, an occupant who visually recognizes the contents of these display areas may feel uncomfortable.

The present disclosure describes a display system for a vehicle, a display method for a vehicle, and a non-transitory computer-readable storage medium for a display system for a vehicle, which are capable of suppressing an occupant from feeling uncomfortable even when image contents are drawn at different frame rates in display areas arranged side by side due to the influence of image processing, image conversion, or the like.

According to an aspect of the present disclosure, a display system for a vehicle includes a first generation unit, a second generation unit, an inter-area image generation unit, and an image output unit. The first generation unit generates a first image content to be displayed in a first display area at a first frame rate. The second generation unit generates a second image content to be displayed at a second frame rate in a second display area adjacent to the first display area. The inter-area image generation unit generates an inter-area image to be displayed in an inter-area between the first display area and the second display area. The image output unit synthesizes and outputs the first image content, the second image content, and the inter-area image.

According to the aspect of the present disclosure, even if the first frame rate in the first display area and the second frame rate in the second display area are different due to the influence of image processing, image conversion, or the like and thus a frame shift occurs, since the inter-area image is displayed between the first display area and the second display area, it is possible to provide drawing without causing the occupant to feel uncomfortable.

According to an aspect of the present disclosure, a display method for a vehicle, including: generating a first image content to be displayed at a first frame rate in a first display area; generating a second image content to be displayed at a second frame rate in a second display area adjacent to the first display area; generating an inter-area image to be displayed between the first display area and the second display area; and synthesizing and outputting the first image content, the second image content and the inter-area image.

According to an aspect of the present disclosure, a non-transitory computer-readable storage medium which stores program instructions for controlling a display system for a vehicle, the program instructions configured to cause a vehicular device of the display system to: generate a first image content to be displayed in a first display area at a first frame rate; generate a second image content to be displayed in a second display area adjacent to the first display area at a second frame rate; generate an inter-area image to be displayed between the first display area and the second display area; and synthesize and output the first image content, the second image content and the inter-area image.

Hereinafter, an embodiment of a vehicle display system 1 will be described with reference to the drawings. In the following description, substantially the same parts are designated with the same reference numerals.

As shown in FIG. 1, the vehicle display system 1 is configured as a cockpit system 4 including a plurality of display devices such as a pillar-to-pillar display device 2 and a center display device 3. The pillar-to-pillar display device 2 will be hereinafter simply referred to as the P-to-P display device 2. Note that the number, the arrangement, or the configuration of the display devices is merely an example, and the present disclosure is not limited thereto.

Figure 2:
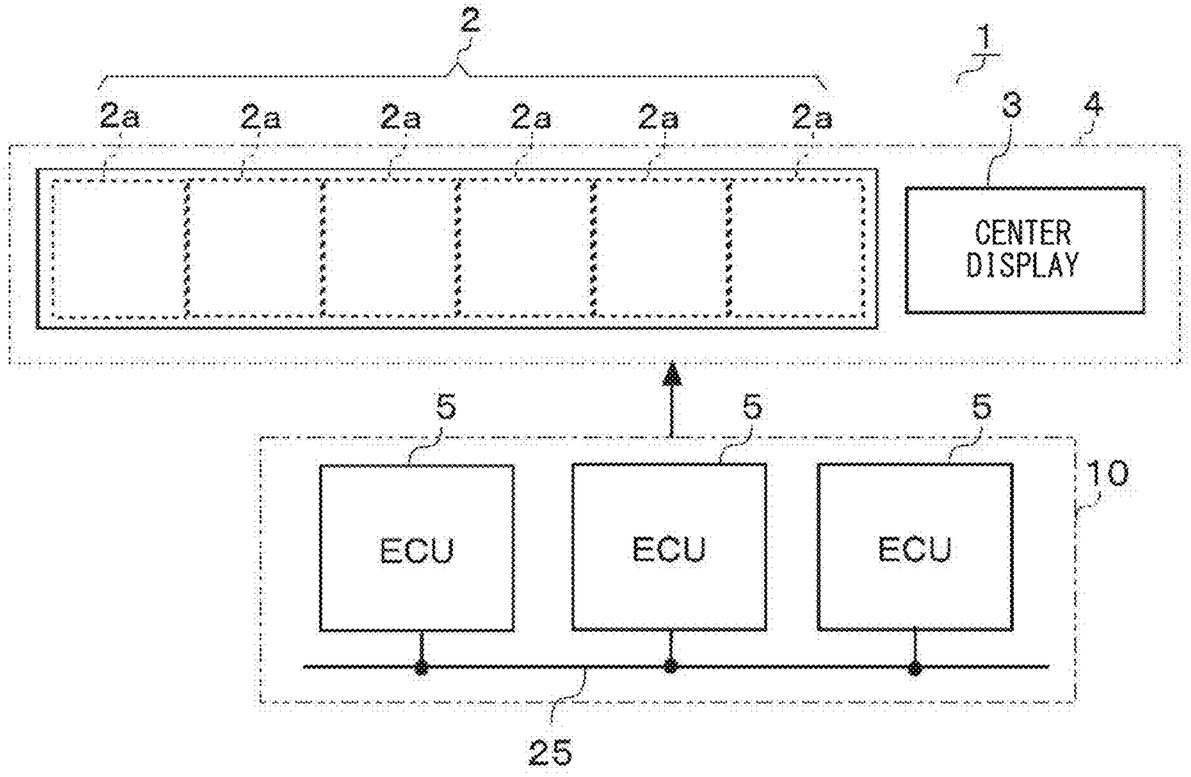
FIG. 2 is a first explanatory diagram illustrating a control mode by ECUs.

As shown in FIG. 2, the P-to-P display device 2 is configured such that a plurality of displays **2*a* are arranged side by side to form a horizontally long screen. Each display 2*a* of the P-to-P display device 2 is configured by a liquid crystal display or an organic EL display. The displays 2*a* of the P-to-P display device 2 provide a large display on a dashboard between a left pillar and a right pillar of the vehicle. The P-to-P display device 2 can display various image contents in a form of full graphic display. Examples of the various image contents include a meter image a (e.g., FIG. 10), a captured image captured by a peripheral camera 23**, entertainment images such as a still image and a video (moving image), and a map image including a peripheral area of a current position.

In this case, the meter image a is displayed on a specific display **2*a* of the P-to-P display device 2, which is positioned in a driver's field of view during normal driving. In a case of an autonomous driving vehicle, the display of the meter image a is limited to this example. Since the P-to-P display device 2 is configured to be long in a lateral direction, the display contents can be confirmed not only by a driver and an occupant in the front seats but also by occupants in the rear seats. On the other hand, the center display device 3 is, for example, configured by a liquid crystal display or an organic EL display, and is installed below the P-to-P display device 2 between a driver seat D and a front passenger seat P. The center display device 3 is provided in the vicinity of a center console to be easily recognized by both the driver and the occupant in the front seats, and is configured to display various contents. An operation panel 21 is formed on the center display device 3 to enable a user to select a content to be displayed on the P-to-P display device 2**, to operate an air conditioning device, to operate an audio device, and to perform an input operation for navigation functions.

The P-to-P display device 2 is arranged adjacent to the center display device 3 in a vertical direction. When two screens are arranged in the vertical direction, it is possible to increase the display area that can be visually recognized by an occupant at one time. Further, in the cockpit system 4, the display screen of each display **2*a* of the P-to-P display device 2 is arranged so as to be positioned on a back side of the display screen of the center display device 3, that is, positioned further from a viewer than the display screen of the center display device 3**.

Figure 3:
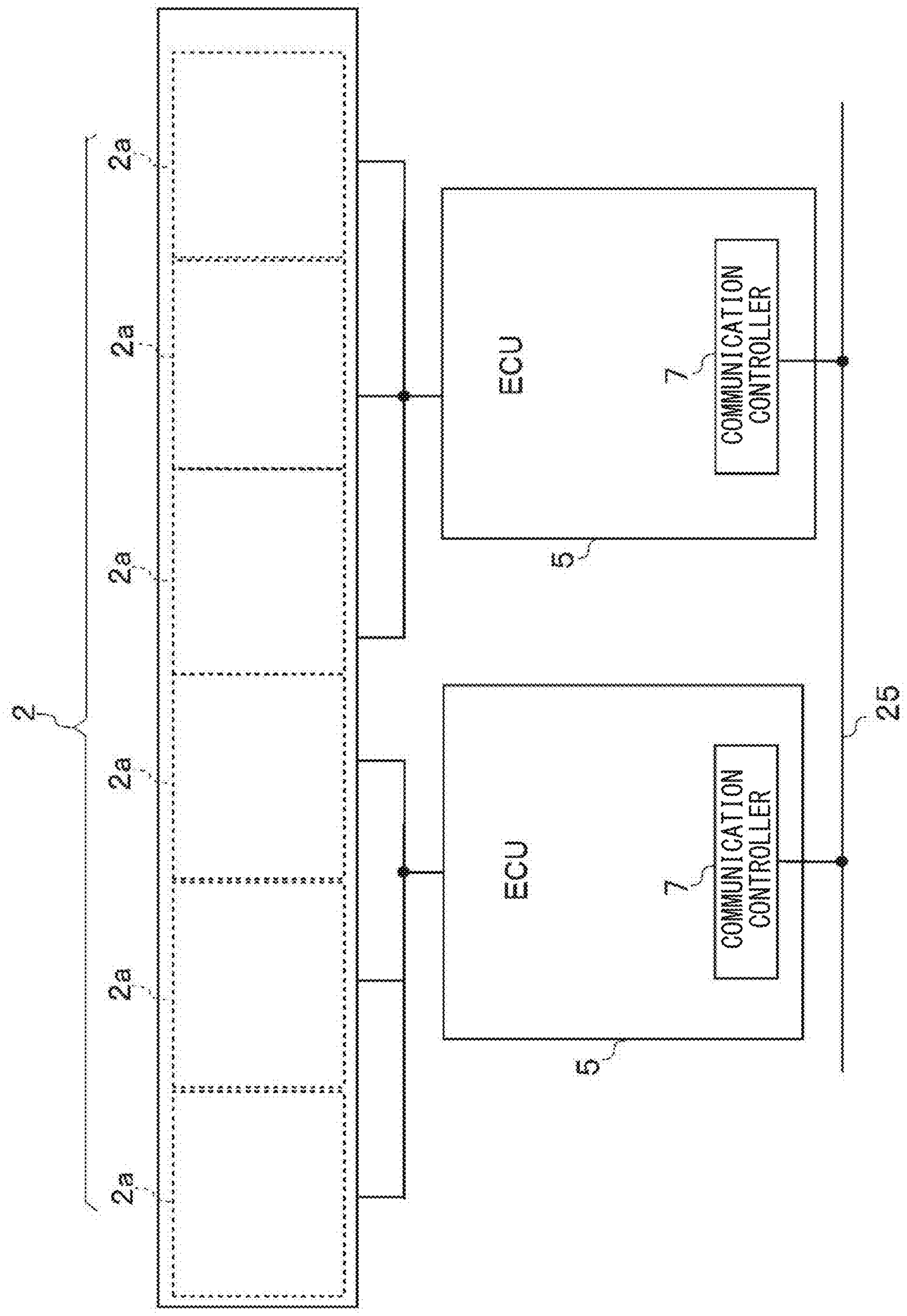
FIG. 3 is a second explanatory diagram illustrating a control mode by the ECUs.

As shown in FIGS. 2 and 3, a large number of ECUs 5 are provided in the vehicle, and are connected to a vehicle interior network 25. The ECUs 5 include a display system ECU, a periphery monitoring system ECU, a travel control system ECU, and a data communication module (DCM) that enables external communication with the outside of the vehicle. Examples of the travel control system ECU include a well-known vehicle control ECU, an engine control ECU, a motor control ECU, a brake control ECU, a steering control ECU, an integrated control ECU, and the like. The travel control system ECU includes an autonomous driving electric control unit (ECU). When receiving an autonomous control signal, the autonomous driving ECU drives driving actuators to execute a driving assistance or an autonomous driving of a predetermined level corresponding to the autonomous control signal.

For example, the driving assistance of a level I executes an automatic braking operation to avoid a collision with an obstacle, a following driving operation that follows a preceding vehicle, and a lane-departure prevention driving operation that controls the vehicle to avoid departing from the traveling lane on both sides. The autonomous driving of a level II can use the driving assistance of the level I, and further execute an autonomous driving under a specific condition, such as an autonomous overtaking of a slow vehicle in an expressway, or an autonomous confluence or divergence on an expressway. Note that in the autonomous driving of the level II, the driver is obliged to monitor the driving of the vehicle. In an autonomous driving of a level Ill or higher, all driving tasks are executed by the system while being monitored by the system.

Each ECU 5 mainly includes a microcomputer having a processor, various storages 6 such as a cache memory, a RAM, and a ROM, an I/O interface, and a bus connecting them. Each ECU 5 is communicably connected to other ECUs 5 provided in the vehicle through a communication controller 7 and a vehicle interior network 25.

In the present embodiment, as shown in FIG. 2, the multiple ECUs 5 of the display system form a vehicular device 10. As shown in FIG. 3, display processing for the P-to-P display device 2 and the center display device 3 are realized by sharing processing capacities of internal physical resources of the multiple display system ECUs 5. The display system ECUs 5 are connected to each other through the vehicle interior network 25. Alternatively, the display system ECUs 5 may be connected to each other by a dedicated line. The storage 6 corresponds to a non-transitory tangible storage medium for non-transitorily storing computer readable programs and data. The non-transitory tangible storage medium is implemented by a semiconductor memory or the like.

Figure 4:
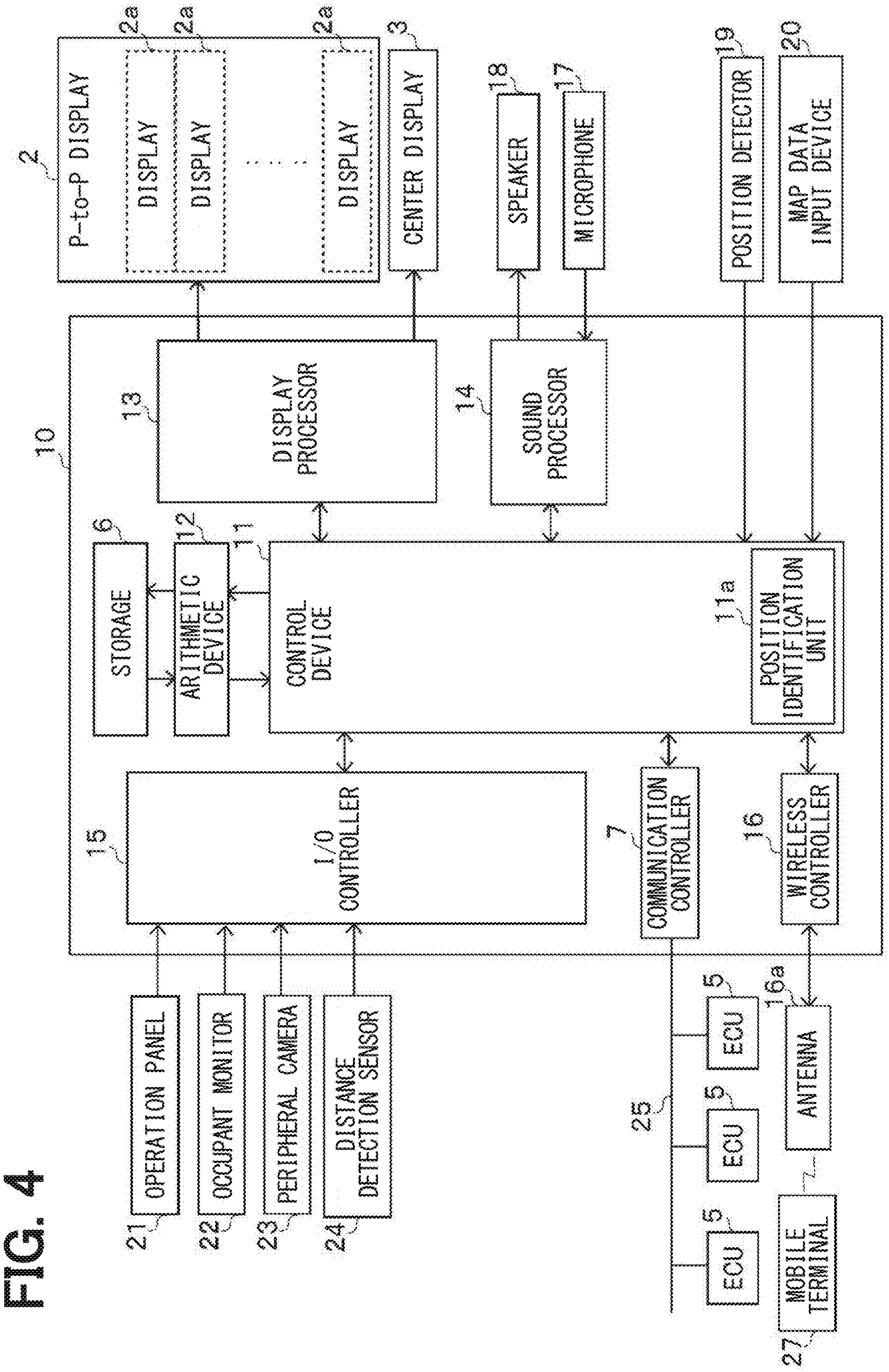
FIG. 4 is an electrical configuration diagram illustrating a vehicle display system for a vehicle according to the embodiment.

As shown in FIG. 4, the vehicular device 10 includes a control device 11, an arithmetic device 12, a storage 6, a display processor 13, a sound processor 14, an I/O controller 15, a communication controller 7 and a wireless controller 16. The I/O controller 15 manages signal input or signal output from various sensors or switches. The communication controller 7 manages communication with another ECU 5. The wireless controller 16 is connected to an antenna **16*a* and is configured to enable wireless connection to another mobile terminal 27 by a wireless LAN or Bluetooth (registered trademark). Here, a configuration where the vehicular device 10 inputs and outputs main components through the 1/O controller 15 will be described. However, the vehicular device 10 may realize the input and output through the vehicle interior network 25 with another ECU 5**, such as the periphery monitoring system ECU or the travel control system ECU.

The wireless controller 16 establishes a communication link with a mobile terminal 27 carried by a vehicle occupant. The vehicular device 10 waits for an incoming call to the mobile terminal 27. When the mobile terminal 27 receives an incoming call from the other party and answers the incoming call, the vehicular device 10 enables a hands-free call with the other party via the mobile terminal 27 using a speaker 18 and a microphone 17. The vehicular device 10 can recognize the voice received through the microphone 17.

Under the control of the control device 11, the arithmetic device 12 calculates a display area to be displayed on the display screens of the P-to-P display device 2 and the center display device 3 for the content of the image and the character stored in the storage 6, calculates in which area of the display screens of the P-to-P display device 2 and the center display device 3 the content of the image and the character is to be displayed in which area the content of the image and the character are superimposed and displayed, and outputs the display area together with the content of the image and the character to the display processor 13 through the control device 11.

Under the control of the control device 11, the display processor 13 performs a display processing for displaying the contents such as images, texts, and characters in the calculated display areas in the display screens of the P-to-P display device 2 and the center display device 3. Thus, the contents such as the images, texts and characters, can be superimposed and displayed on the display screens of the displays 2 and 3 for each display layer. Under the control of the control device 11, the sound processor 14 receives a reception voice input from the microphone 17 and outputs a transmission voice from the speaker 18. When receiving the contents such as the texts and the characters from the control device 11, the sound processor 14 converts them into voice, reads them out through the speaker 18 for outputting.

A position detector 19 detects a position with high accuracy using a well-known GNSS receiver such as GPS (not shown) and an inertial sensor such as an acceleration sensor or a gyro sensor. The position detector 19 outputs a position detection signal to the control device 11 through the 1/O controller 15. The control device 11 has a position identification unit 11*a*. The position identification unit 11*a* implements a function as an advanced driver assistance systems (ADAS) locator that sequentially measures the current position of the vehicle with high accuracy based on a map information input from a map data input device 20 and the position detection signal of the position detector 19. In this case, the vehicle position is represented in a coordinate system using latitude and longitude. In this coordinate system, for example, x-axis indicates longitude and y-axis indicates latitude Note that the measuring of the vehicle position may be executed in various manners in addition to the above-described method. For example, the position of the vehicle may be specified based on a travelling distance information obtained from the detection result by a vehicle speed sensor mounted on the subject vehicle. The control device 11 can perform a so-called navigation process based on the current position of the subject vehicle.

The operation panel 21 is a touch panel configured on the center display device 3. When there is an operation input by the occupant, the 1/O controller 15 receives the operation input and outputs an operation signal to the control device 11. The control device 11 executes control based on operation signals from the operation panel 21.

An occupant monitor 22 detects the state of the occupant in the vehicle or the operation state. For example, the occupant monitor 22 includes a power switch, an occupant state monitor, a turn switch, an automatic control switch, and a travel mode setting switch. The occupant monitor 22 outputs a sensor signal to the control device 11. The occupant state monitor may include a steering sensor that detects whether the steering wheel is being gripped or steered by a driver, a seat sensor that detects whether the driver is seated, an accelerator pedal or brake pedal depression sensor, and the like.

The power switch is turned on by a user in the vehicle cabin in order to start an internal combustion engine or an electric motor, and outputs a signal corresponding to the user's operation. The occupant state monitor includes a camera that detects the state of the occupant on the driver's seat D or the front passenger's seat P by photographing the state of the occupant with an image sensor, and outputs an image signal. The occupant state monitor for the driver is referred to as a driver status monitor (DSM). The occupant state monitor obtains an image signal obtained by irradiating the face of the driver with near-infrared light and capturing an image, analyzes the image as necessary, and outputs the signal to the control device 11. These occupant state monitors are used to detect the state of the occupant such as the driver, especially during the driving assistance operation or the autonomous driving operation. A turn switch is turned on by an occupant in the vehicle cabin to activate a direction indicator of the subject vehicle, and outputs a turn signal indicating turning right or left according to the operation.

The automatic control switch outputs an automatic control signal in response to the occupant operation when the occupant in the vehicle cabin executes an on-operation in order to command an autonomous control of the driving state of the vehicle. The control device 11 executes the driving assistance or the autonomous driving of a predetermined level by operating the ECU of the travel control system.

A travel mode setting switch outputs a travel mode signal indicating a travel mode such as snow, eco, normal, or sport by being turned on by the occupant in the vehicle cabin in order to command the travel mode of the vehicle. The control device 11 sets the travel mode based on the travel mode signal, and operates the travel control system ECU to execute the driving assistance based on the travel mode.

The control device 11 can determine the behavior of the occupant of the vehicle, for example, a direction in which the line of sight of the occupant is directed, based on the output signal of the occupant monitor 22. Also, the control device 11 can receive the operation state of the power switch, the operation state of a direction indicator, command information for autonomous control of the vehicle, traveling mode information, sensor information and operation information from various sensors, and the like.

A peripheral camera 23 provides a peripheral monitoring sensor configured by such as a front camera that images the front of the vehicle, a back camera that images the rear of the vehicle, a corner camera that images the front side and the rear side of the vehicle, a side camera that images the side of the vehicle, and an electronic mirror. Signals from the peripheral camera 23 are provided to the control device 11 through the I/O controller 15 as image signals of a front guide monitor, a back guide monitor, a corner view monitor, and a side guide monitor. The communication controller 7 is connected to the vehicle interior network 25 such as CAN or LIN, and controls data communication with other ECUs 5.

The vehicle is equipped with a distance detection sensor 24 as an example of the peripheral monitoring sensor. The distance detection sensor 24 detects the distance to an obstacle. The distance detection sensor 24 includes a clearance sonar, a LiDAR, a radar using a millimeter wave or a quasi-millimeter wave, and the like. The distance detection sensor 24 detects objects, such as vehicles, human, and animals, approaching the front of the vehicle, the front side of the vehicle, the rear side of the vehicle, the rear of the vehicle, or the sides of the vehicle, and other objects such as fallen objects on the road, guardrails, curbs, trees, and the like. The distance detection sensor 24 can also detect the azimuth to the obstacle and the distance to the obstacle. In addition, with the peripheral monitoring sensor described above, it is possible to detect road markings such as traffic lane markings, stop lines, and pedestrian crossings indicated on the road around the subject vehicle, traffic signs such as a "stop" sign indicated on the road, and a stop line indicated at a boundary of an intersection.

Figure 5:
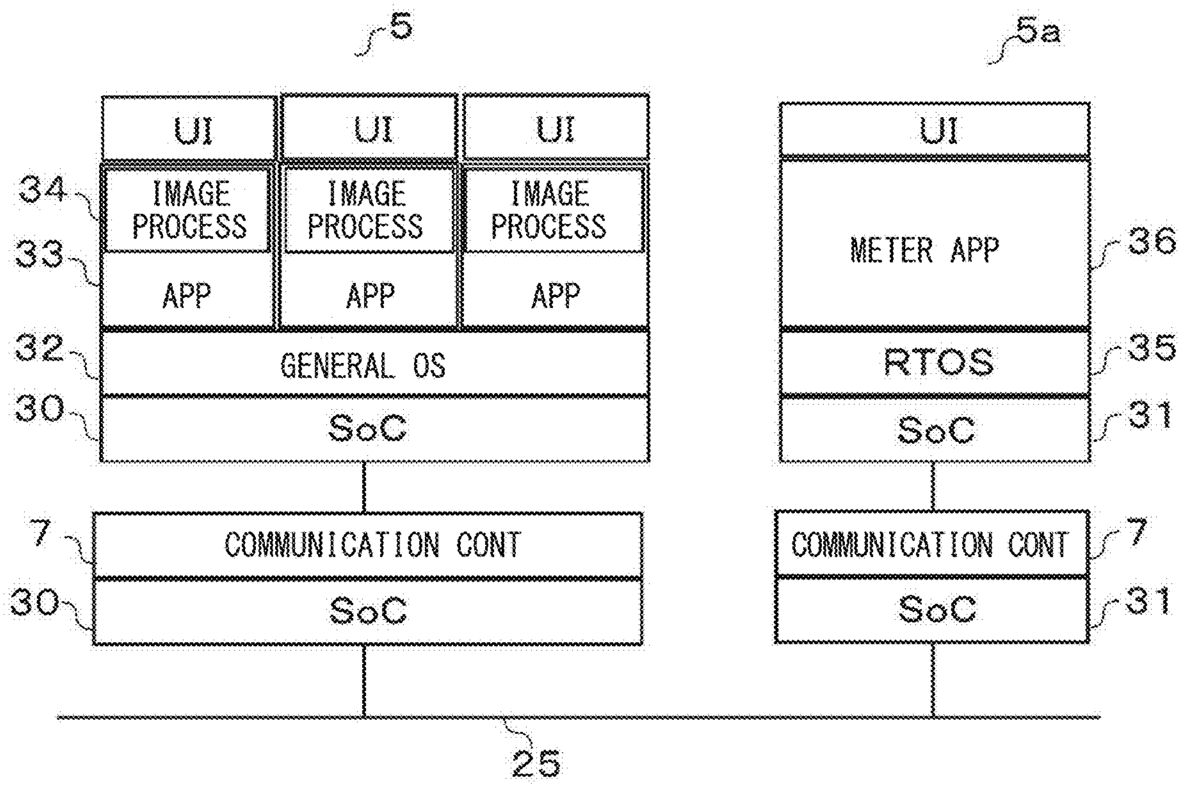
FIG. 5 is a schematic diagram illustrating hardware and software configurations of the vehicle display system.

FIG. 5 shows an example of the hardware and software configurations of the vehicular device 10. The ECUs 5 and 5*a* are provided with SoCs 30 and 31, respectively. The SoCs 30, 31 are provided with the microcomputers described hereinabove, respectively. The microcomputers provided in the SoCs 30 and 31 of the ECUs 5 are configured to operate various applications (APP in FIG. 5) on a pre-installed general-purpose OS 32, such as Linux OS (Linux is a registered trademark). The SoC is an abbreviation for System-On-Chip.

An application 33 includes an image processing application 34 and other applications. A processor equipped in the SoC 30 executes a drawing processing for the display screen of each display 2*a* of the P-to-P display device 2 in response to a drawing request from the image processing application 34.

In FIG. 5, the ECU 5*a* indicates the ECU provided for the purpose of drawing a meter. On the microcomputer equipped in the SoC 31 of the ECU 5*a*, a real-time OS (RTOS) 35 capable of processing with higher real-time performance than the general-purpose OS 32 is installed, and a meter application 36 is operated on the real-time OS 35. Note that the following description may focus on the applications 33 such as the image processing application 34 and the meter application 36.

The meter application 36 is an application for notifying the user of the speed or the number of revolutions of the vehicle, a warning, or the like, and generates and draws image contents, which are to be mainly displayed in the display areas R1 and R2 of specific displays 2*a* of the P-to-P display device 2. For example, the meter application 36 generates and draws an image content such as a speedometer, a tachometer, a shift range position, or a warning light. The speedometer includes a speed image whose display needs to be updated in real time to show changes in the speed of the vehicle. Similarly, the tachometer is also included in the meter image a, as the display of which needs to be updated in real time to show changes in the number of revolutions. The communication controller 7 communicates with other ECUs 5 through the vehicle interior network such as CAN and LIN.

The content drawn by the meter application 36 can also be displayed on another display, for example, on the center display device 3. The content drawn by the meter application 36 is required to have relatively more real-time performance than the content drawn by other applications.

The application 33 includes a navigation application and the like. The navigation application implements a navigation function and mainly shows image contents of such as a map image d (e.g., FIG. 10) and a navigation screen including the current position of the vehicle, which are mainly displayed on the P-to-P display device 2.

Figure 6:
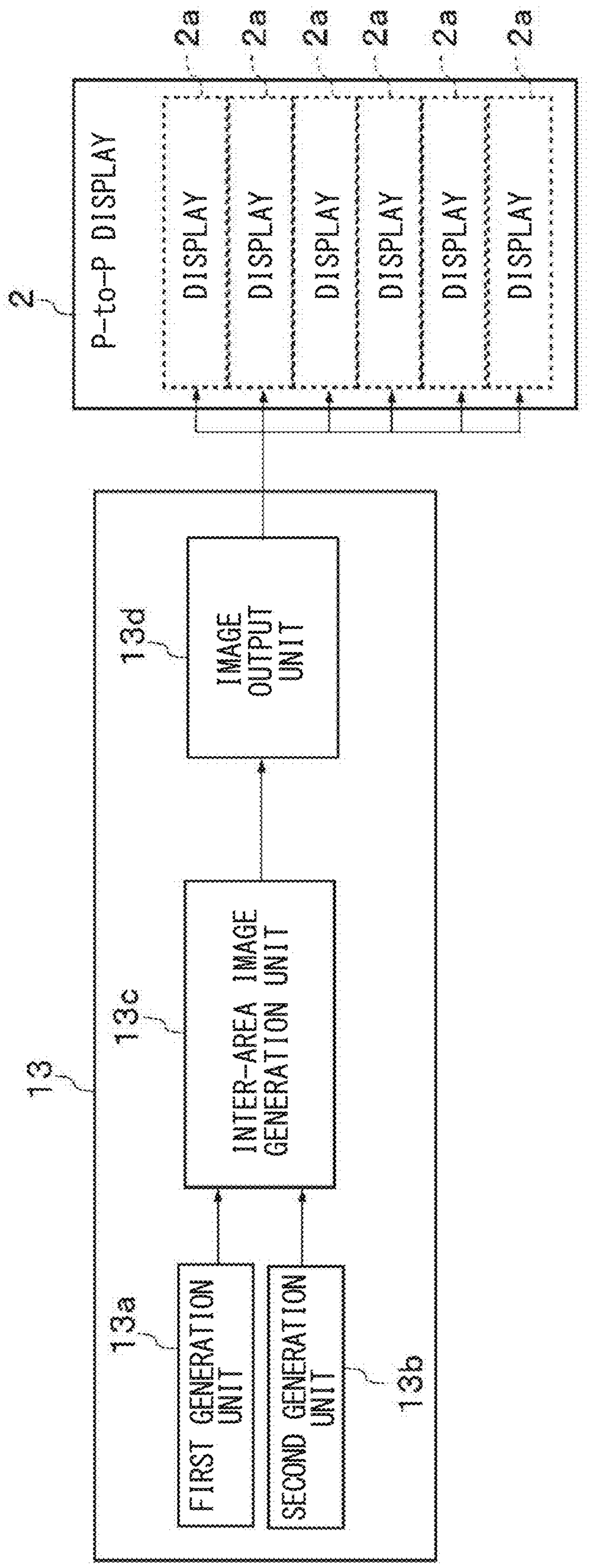
FIG. 6 is an explanatory diagram illustrating a flow of control of the vehicle display system.

The application 33 includes an image generation application. The image generation application is an application that generates an image content to be displayed on each display 2*a* of the P-to-P display device 2, and realizes the functions of the first generation unit 13*a* and the second generation unit 13*b* shown in FIG. 6.

The application 33 includes an inter-area image generation application. The inter-area image generation application is an application that generates an inter-area image 50 to be displayed between the display areas R1 and R2 of the respective displays 2*a* of the P-to-P display device 2, and realizes a function as the inter-area image generation unit 13*c* shown in FIG. 6.

The application 33 also includes an image synthesizing application. The image synthesizing application is an application that specifies the size and type of various image contents to be displayed on the P-to-P display device 2, synthesizes the images of the image contents into one frame, and outputs the synthesized mixed image to each display 2*a* of the P-to-P display device 2. The image synthesizing application has a function as an image synthesizing unit, which is also referred to as a compositor, and realizes a function as an image output unit 13*d* shown in FIG. 6.

Among the applications 33 and 36, the application that draws the image content is assigned a display layer for drawing the image content. These display layers are secured on the storage 6 in a size capable of drawing necessary image contents.

Also, the image content to be displayed on each of the display device 2 and the display 3 can be animated. Here, the animation operation is a display mode, such as a display mode in which a position and a size of an image indicating the content gradually change, a display mode in which the image rotates, a display mode in which a user interface moves as a whole along with a swipe operation, a display mode in which the image gradually fades in or fades out, or a display mode in which the color of the image changes.

Figure 10:
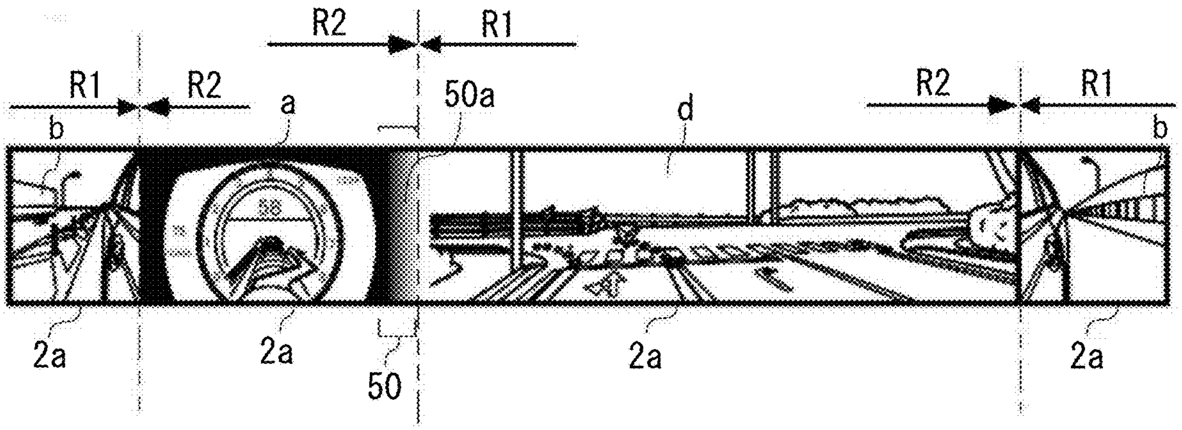
FIG. 10 is a diagram illustrating a display mode as a third example.

For example, the meter image a, such as a speedometer or a tachometer, and the map image d shown in FIG. 10 are image contents whose size or position changes depending on the display mode or the display device 2 or 3 on which the image contents are to be displayed. However, the animation operation is not limited thereto, and any animation operation in which the display mode changes continuously or intermittently from a certain time point is included.

Next, an operation of the configuration described above will be described. The vehicular device 10 execute drawing on respective displays 2*a* of the P-to-P display device 2 by sharing the physical resources of the multiple ECUs 5. In this case, if a difference occurs in generation speed of drawing data as a result of the execution of image processing, image conversion, or the like, due to the bus size being insufficient or the like, a difference of drawing frame rate occurs between the drawing image contents displayed on the adjacent displays 2*a* of the P-to-P display device 2.

Figure 8:
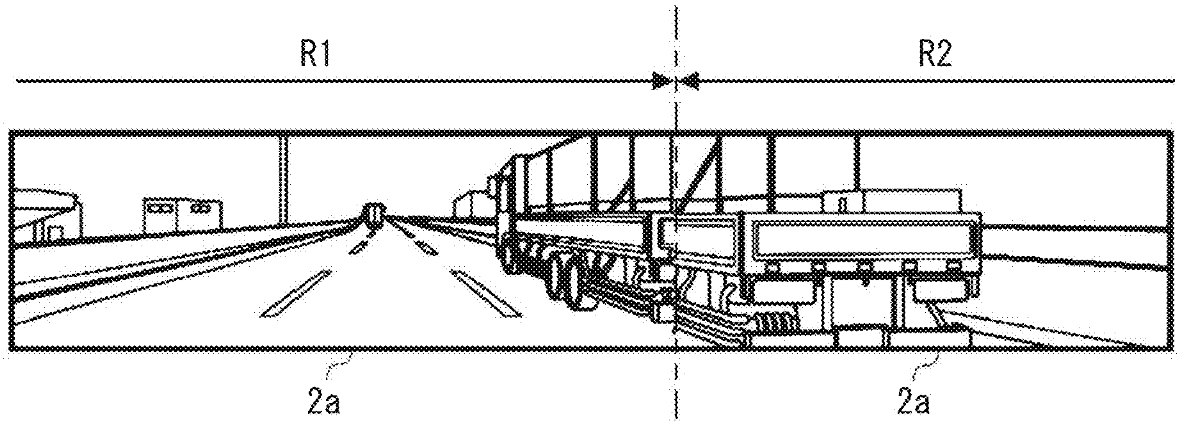
FIG. 8 is a diagram illustrating a display mode as a first example.

As shown in FIG. 8, if the image content is simply displayed on two adjacent displays 2*a*, a frame delay may occur in the image content displayed on one of the displays 2*a*, and thus an occupant of the vehicle may feel uncomfortable.

Figure 7:
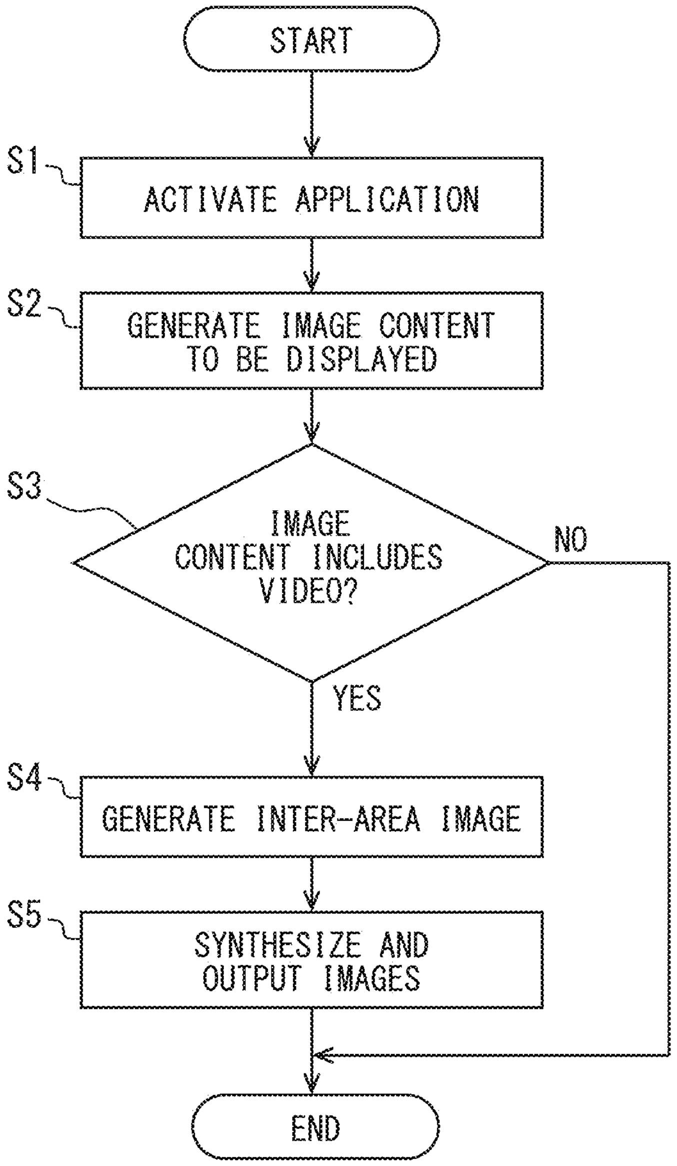
FIG. 7 is a flowchart illustrating a drawing processing executed by the vehicle display system.

Therefore, the vehicular device 10 preferably executes the drawing processing shown in a flowchart of FIG. 7 to draw the image content on each display 2*a*.

The vehicular device 10 activates the application in S1, and then generates image contents to be displayed in the display areas R1 and R2 of each display 2*a* based on requests from various applications in S2. In this case, in regard to the adjacent displays 2*a*, the vehicular device 10 causes the first generation unit 13*a* to generate a first image content to be displayed in the first display area R1 and the second generation unit 13*b* to generate a second image content to be displayed on the second display area R2.

The vehicular device 10 determines in S3 whether or not these image contents include videos. The image content is a still image or a video. The vehicular device 10 determines in S3 whether or not to display the image content of the video in the display areas R1 and R2 of each of the displays 2*a* of the P-to-P display device 2. When it is determined that the image content to be displayed on any one of the display areas R1 and R2 contains the video, the vehicular device 10 execute processes of S4 and S5.

When it is determined that the image content generated includes video, the vehicular device 10 causes the inter-area image generation unit 13*c* to generate an inter-area image 50 to be displayed between the display areas R1 and R2 of the displays 2*a* in S4. The inter-area image 50 is referred to as a segmented image, a divided image, or an inter-view image, and various image contents can be used. A detailed example of the inter-area image 50 will be described later.

Thereafter, in S5, the display processor 13 causes the image output unit 13*d* to synthesize the image contents to be displayed in the display areas R1 and R2 of the respective displays 2*a* and the inter-area image 50 and to output the synthesized image.

The display processor 13 draws the first image content in the first display area R1 of the display 2*a*, which is a part of the P-to-P display device 2, while changing the rate with the first frame rate as an average, and draws the second image content in the display area R2 of the display 2*a*, which is another part of the P-to-P display device 2, while changing the rate with the second frame rate as an average.

In this case, even if the first frame rate and the second frame rate are different from each other due to the influence of image processing, image conversion, or the like, and a slight frame shift occurs, the display processor 13 performs the display processing of displaying the inter-area image 50 between the display areas R1 and R2. Therefore, it is possible to realize the display without causing an occupant to feel uncomfortable.

Figure 9:
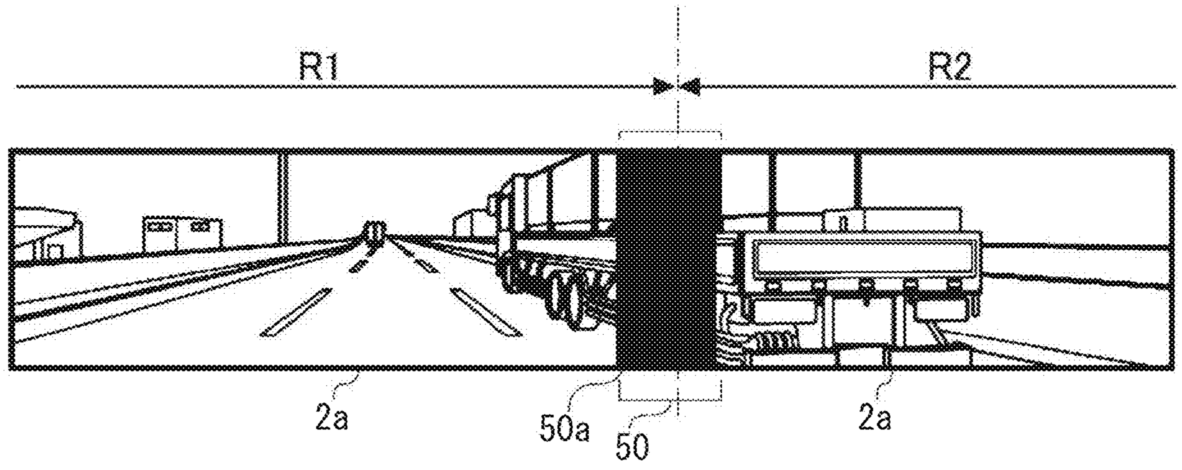
FIG. 9 is a diagram illustrating a display mode as a second example.

For example, as shown in FIG. 9, the inter-area image 50 may be generated by a still image such as a black strip 50*a*. In this case, it is possible to ensure a distance between the videos displayed on the multiple displays 2*a*. As such, an occupant can easily recognize individual displays 2*a*. Therefore, the occupant's visual recognition improves.

Hereinafter, application examples of the inter-area image 50 will be described. In the following application examples, a vehicle environment, an in-vehicle environment, and the like are listed, and an inter-area image 50 considered to be suitable among various inter-area images 50 is exemplified.

First, the display processor 13 may change the inter-area image 50 depending on the type of the first image content to be displayed in the first display area R1 or the type of the second image content to be displayed in the second display area R2. For example, the display processor 13 performs display processing of the map image d including the current position, the captured image b by the peripheral camera 23, the meter image a, and the like. For example, the display processor 13 executes the display processing so that the map image d including the current position has a frame rate of about 10 fps, and the captured image b by the peripheral camera 23 has a frame rate of about 30 fps.

As shown in FIG. 10, the display processor 13 may generate and display the black strip 50*a* as the inter-area image 50 between the map image displayed in the first display area R1 and the meter image a displayed in the second display area R2. The black strip 50*a* is a still image that is configured with black as a base and is subjected to a gradation processing from the second display area R2 in which the meter image a is displayed toward the first display area R1 in which the map image d is displayed. Accordingly, it is possible to provide a distance between the first display area R1 and the second display area R2. As such, it is possible to reduce a sense of incongruity when the occupant visually recognizes.

Figure 11:
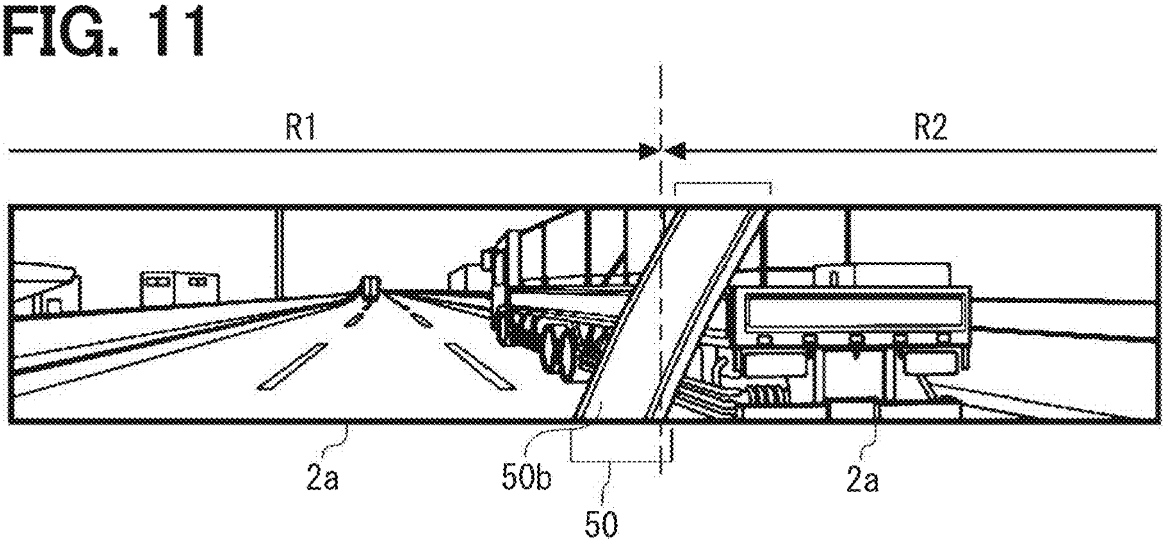
FIG. 11 is a diagram illustrating a display mode as a fourth example.
Figure 12:
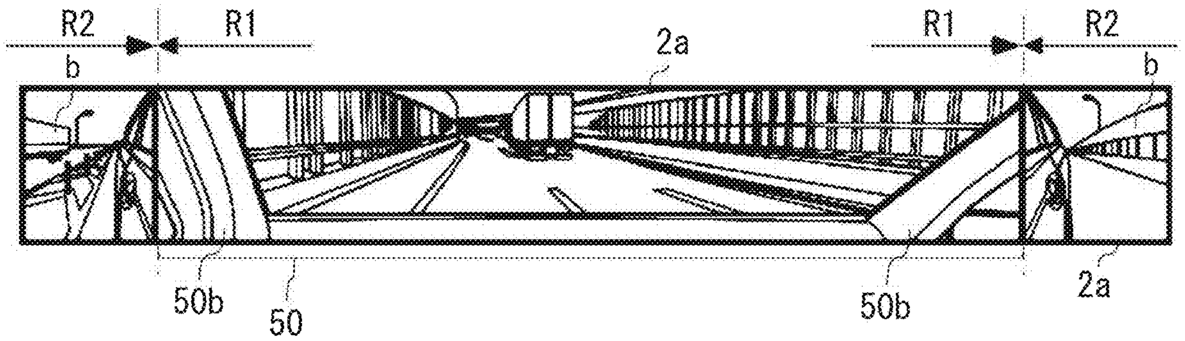
FIG. 12 is a diagram illustrating a display mode as a fifth example.
Figure 13:
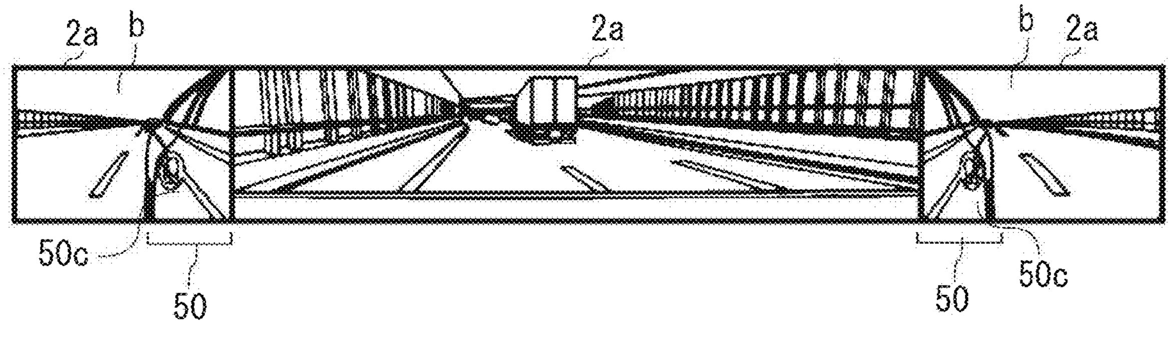
FIG. 13 is a diagram illustrating a display mode as a sixth example.

The inter-area image 50 may be generated in a vehicle equipment mode so as to include an equipment of the vehicle. Examples of the vehicle equipment mode include a pillar image, a side body, a meter design component, a form of a side mirror, and a vehicle shaped object. For example, as shown in FIGS. 11 and 12, the inter-area image 50 may employ an in-vehicle object, such as an A-pillar, which does not change, or a 2D or 3D in-vehicle imitation structure 50*b* imitating an in-vehicle structural object. For example, as shown in FIG. 13, the inter-area image 50 may employ a side body 50*c*. Accordingly, it is possible to reduce a sense of discomfort of the user in the vehicle.

In addition, it is desirable to change the inter-area image 50 according to a traveling scene. For example, the content of the inter-area image 50 may be changed based on a navigation function depending on whether the current position of the vehicle is a specific place, for example, inside or outside a tunnel.

Similarly, day and night may be detected by a light receiving sensor of an automatic light, and the inter-area image 50 may be changed for each time zone. For example, the display processor 13 may perform display processing by using, as the inter-area image 50, an image content having a bright color tone based on white in a time zone in which the outside is bright in the daytime, and using, as the inter-area image 50, an image content having a dark color tone based on black in a time zone in which the outside is dark in the nighttime.

As another example, the display processor 13 may communicate with an external server using the DCM to acquire weather information of the current position of the vehicle, and change the content of the inter-area image 50 according to the weather information. In a case where the weather information indicates clear and sunny, the display processor 13 sets the image content of a bright color as the inter-area image 50. In a case where the weather information indicates cloudy, rainy, or thunderstorm, the display processor 13 sets the image content of a dark color as the inter-area image 50.

It is desirable that the display processor 13 changes the inter-area image 50 depending on the importance of the information to be displayed in the display areas R1 and R2. When the information to be displayed in the display areas R1 and R2 is, for example, information related to the safety of the vehicle and has a high degree of importance, the display processor 13 may change the display mode so that the entire width of the inter-area image 50 is narrower than the standard value. Examples of the content that provides information related to the safety of the vehicle and has a high degree of importance include, for example, the image captured by the peripheral camera 23 including an electronic mirror and the meter image a. The display processor 13 can display the inter-area image in a more desirable manner by narrowing the entire width of the inter-area image 50 to be smaller than the standard value. Accordingly, it is possible to improve visibility for the occupant.

On the other hand, for example, in a case where the image content has entertainment properties, does not provide information related to the safety of the vehicle, and has a degree of importance lower than a predetermined degree, the display processor 13 may change the width of the inter-area image 50 to be wider.

In addition, it is desirable to change the inter-area image 50 according to the driving scene. For example, a distance to a preceding vehicle, a following vehicle, or an obstacle existing around the vehicle is detected by the peripheral monitoring sensor such as the distance detection sensor 24. When it is determined that the distance is smaller than a predetermined risk reference value and the risk of the vehicle colliding with the obstacle is higher than a predetermined level, the display processor 13 may change the inter-area image 50 so as to narrow the entire width of the inter-area image 50 Accordingly, it is possible to improve visibility for the occupant. If the risk is lower than the predetermined level, the display processor 13 may increase the width of the inter-area image 50.

The control device 11 may change the width of the inter-area image 50 in accordance with a turn signal indicating the operation state of the direction indicator. For example, if the direction indicator blinks to indicate a right turn, the width of the inter-area image 50 located on the right side may be reduced. Accordingly, it is possible to improve visibility for the occupant.

It is desirable to change the inter-area image 50 according to the travel mode. The inter-area image 50 may be changed based on the operating state of the travel mode setting switch. The inter-area image 50 may be set to have a width narrower than the standard value in the sport mode in which the speed is higher than that in the normal mode or the eco mode. Accordingly, the visibility can be further improved in the sport mode. The inter-area image 50 may be changed based on the operation state of the automatic control switch. In the case of manual driving, the width of the inter-area image 50 may be the widest, and the width of the inter-area image 50 may be narrowed in the driving assistance and may be further narrowed in the autonomous driving. The width of the inter-area image 50 may be narrowed as the autonomous driving level becomes higher. Note that the width of the inter-area image 50 is not limited to being changed stepwise.

The inter-area image 50 may be changed depending on the position of the areas of the adjacent displays 2*a*, between the left pillar and the right pillar. For example, in the P-to-P display device 2, the width of the inter-area image 50 displayed between the display areas R1 and R2 of the adjacent displays 2*a*, which are positioned in the vicinity of the center of the P-to-P display device 2 is high in visibility, and thus may be larger than a predetermined width. On the contrary, it is desirable that the width of the inter-area image 50 displayed between the display areas R1 and R2 of the adjacent displays 2*a*, which are positioned in the vicinity of one of the ends of the P-to-P display device 2 be narrower than the predetermined width. This is because the visibility is low in the vicinity of the ends of the P-to-P display device 2.

As described above, according to the present embodiment, the inter-area image generation unit 13*c* of the display processor 13 generates the inter-area image 50 to be displayed in the inter-area between the first display area R1 and the second display area R2, and the image output unit 13*d* synthesizes and outputs the first image content, the second image content, and the inter-area image 50.

Even if the first frame rate of the first display area R1 and the second frame rate of the second display area R2 are consequently different from each other due to the influence of image processing, image conversion, or the like, and a frame shift thus occurs, since the inter-area image 50 is displayed between the first display area R1 and the second display area R2, it is possible to perform drawing without causing a sense of discomfort to the occupant.

OTHER EMBODIMENTS

The present disclosure is not limited to the embodiments described hereinabove, but can be implemented by various modifications, and can be applied to various embodiments without departing from the spirit of the present disclosure.

The first image content and the second image content may be the same content or may be different contents from each other. The inter-area image 50 may be any image content as long as it has a width or a height.

A space such as an outer frame of the display 2*a*, in other words, a non-display area in which display control of the display 2*a* is not possible, may be or may not be provided between the first display area R1 and the second display area R2 of the adjacent displays 2*a*. The inter-area image 50 may or may not be adjacent to the non-display area. The first frame rate and the second frame rate vary with time, respectively. As long as the first frame rate and the second frame rate temporally vary, there may be a moment at which the first frame rate and the second frame rate become the same frame rate.

The techniques of the control device 11 and the vehicular device 10 described in the present disclosure may be realized by a dedicated computer provided by configuring a processor and a memory programmed to execute one or more functions embodied by a computer program. Alternatively, the control device 11, the vehicular device 10, and the techniques thereof described in the present disclosure may be realized by a dedicated computer provided by configuring a processor with one or more dedicated hardware logic circuits. Alternatively, the control device 11 and the vehicular device 10 and the techniques thereof according to the present disclosure may be achieved using one or more dedicated computers including a combination of the processor and the memory programmed to execute one or more functions and the processor with one or more hardware logic circuits. The computer program may also be stored on a computer readable non-transitory tangible storage medium as instructions to be executed by a computer. In the drawing, the reference numeral 13*a* denotes the first generation unit, the reference numeral 13*b* denotes the second generation unit, the reference numeral 13*c* denotes the inter-area image generation unit, and the reference numeral 13*d* denotes the image output unit.

Although the present disclosure has been described with reference to the foregoing embodiments, it is understood that the present disclosure is not limited to such embodiments or structures. The present disclosure encompasses various modifications and variations within the scope of equivalents. In addition, various combinations and modes, as well as other combinations and modes including only one element, more, or less, are within the scope and idea of the present disclosure.

What is claimed is:

1. A display system for a vehicle, comprising:

a first display having a first display area;

a second display different from the first display and disposed adjacent to the first display, the second display having a second display area adjacent to the first display area; and a vehicular device including at least one processor and a memory storing instructions that, when executed by the at least one processor, cause the vehicular device to:

generate a first image content to be displayed at a first frame rate in the first display area;

generate a second image content to be displayed at a second frame rate in the second display area;

determine whether at least one of the first image content or the second image content includes video;

in response to determining that the at least one of the first image content or the second image content includes video, generate an inter-area image, as an inter-view image, that is different from the at least one of the first image content or the second image content and is to be displayed in a predetermined boundary region within at least one of the first display area or the second display area, the predetermined boundary region being adjacent to the other of the first display area and the second display area; and synthesize and output, to the first display and the second display, the first image content, the second image content, and, when generated, the inter-area image.

2. The display system for a vehicle according to claim 1, wherein the instructions further cause the vehicular device to change the inter-area image according to a traveling scene in which the vehicle travels.

3. The display system for a vehicle according to claim 1, wherein the instructions further cause the vehicular device to:

determine an importance level of information to be displayed in the first display area or the second display area based on whether the information is vehicle-safety-related information; and when the information is the vehicle-safety-related information, reduce a width of the inter-area image to be smaller than a predetermined standard width.

4. The display system for a vehicle according to claim 1, wherein the instructions further cause the vehicular device to change the inter-area image according to a driving scene in which the vehicle is driven.

5. The display system for a vehicle according to claim 1, wherein the instructions further cause the vehicular device to change the inter-area image according to a type of the first image content or the second image content, and the type of the first image content or the second image content includes at least one of: a map image including a current position of the vehicle; a captured image captured by a peripheral camera, and a meter image.

6. The display system for a vehicle according to claim 1, wherein the inter-area image is a still image including a black strip.

7. The display system for a vehicle according to claim 1, wherein the instructions further cause the vehicular device to change the inter-area image according to a position of the at least one of the first display or the second display within a vehicle.

8. The display system for a vehicle according to claim 1, wherein the instructions further cause the vehicular device to generate the inter-area image in a mode including an equipment of the vehicle.

9. The display system for a vehicle according to claim 1, wherein the inter-area image is at least one of a vehicle-equipment-mode image, a single-color still image, or a still image having a gradation.

10. The display system for a vehicle according to claim 1, wherein the inter-area image is an image configured to provide a visual separation distance between the first display area and the second display area to reduce visual discontinuity caused by a frame shift between the first image content and the second image content.

11. A display method for a vehicle, comprising:

generating a first image content to be displayed at a first frame rate in a first display area of a first display;

generating a second image content to be displayed at a second frame rate in a second display area of a second display different from the first display and disposed adjacent to the first display, the second frame rate being different from the first frame rate, the second display area being adjacent to the first display area;

when at least one of the first image content or the second image content includes video, generating an inter-area image, as an inter-view image, that is different from the at least one of the first image content or the second image content and is to be displayed in a predetermined boundary region within at least one of the first display area or the second display area, the predetermined boundary region being adjacent to the other of the first display area and the second display area; and synthesizing and outputting, to the first display and the second display, the first image content, the second image content and the inter-area image.

12. A non-transitory computer-readable storage medium which stores program instructions for controlling a display system for a vehicle, the program instructions configured to cause a vehicular device of the display system to:

generate a first image content to be displayed in a first display area of a first display at a first frame rate;

generate a second image content to be displayed in a second display area of a second display at a second frame rate, the second display being different from the first display and disposed adjacent to the first display, the second display area being adjacent to the first display area;

when at least one of the first image content or the second image content includes video, generate an inter-area image, as an inter-view image, that is different from the at least one of the first image content or the second image content and to be displayed in a predetermined boundary region within at least one of the first display area or the second display area, the predetermined boundary region being adjacent to the other of the first display area and the second display area; and synthesize and output, to the first display and the second display, the first image content, the second image content and the inter-area image.

* * * * *